US012750812B2

(12) United States Patent
Wang et al.

(10) Patent No.: US 12,750,812 B2
(45) Date of Patent: Sep. 29, 2026

(54) POSITIONING METHOD, APPARATUS, DEVICE, AND STORAGE MEDIUM

(71) Applicant: Beijing Xiaomi Mobile Software Co., Ltd., Beijing (CN)

(72) Inventors: Xinli Wang, Beijing (CN); Yang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 214 days.

(21) Appl. No.: 18/837,375

(22) PCT Filed: Feb. 10, 2022

(86) PCT No.: PCT/CN2022/075939

§ 371 (c)(1),
(2) Date: Aug. 9, 2024

(87) PCT Pub. No.: WO2023/150990

PCT Pub. Date: Aug. 17, 2023

(65) Prior Publication Data

US 2025/0151013 A1 May 8, 2025

(51) Int. Cl.
*H04W 64/00* (2009.01)
*H04W 8/00* (2009.01)
(Continued)

(52) U.S. Cl.
CPC ........... *H04W 64/00* (2013.01); *H04W 8/005* (2013.01); *H04W 76/30* (2018.02)

(58) Field of Classification Search
CPC ..... H04W 64/00; H04W 8/005; H04W 76/30; H04W 4/02
(Continued)

(56) References Cited

U.S. PATENT DOCUMENTS

2018/0184249 A1* 6/2018 Dowlatkhah ......... H04W 4/023
2020/0107256 A1* 4/2020 Nilsson ................. H04W 76/11
(Continued)

FOREIGN PATENT DOCUMENTS

CN 111770539 A 10/2020
CN 112205008 A 1/2021
(Continued)

OTHER PUBLICATIONS

CATT, vivo, Tencent, "Package of editorial modification",3GPP TSG-SA WG2 Meeting #137E, S2-2002105, Feb. 24-27, 2020, Elbonia.

*Primary Examiner* — Don N Vo
(74) *Attorney, Agent, or Firm* — Volpe Koenig

(57) ABSTRACT

A method, apparatus and computer readable medium for locating a target User Equipment. The target UE is located by: receiving a position request transmitted by a position request device, where the position request includes a list of observer UEs and an allowed delay; requesting a ranging service from observer UE, where the ranging service is configured to enable observer UE to range on target UE; obtaining a ranging result transmitted by a current service access and mobility management function (AMF) corresponding to first observer UE, where the ranging result includes relative positions between the first observer UE and the target UE; transmitting a first location request to the current service AMF corresponding to the first observer UE; and obtaining position information, transmitted by the current service AMF corresponding to the first observer UE, of the target UE.

20 Claims, 11 Drawing Sheets

(51) Int. Cl.
*H04W 76/00* (2018.01)
*H04W 76/30* (2018.01)

(58) Field of Classification Search
USPC ........................................................ 455/456.1
See application file for complete search history.

(56) References Cited

U.S. PATENT DOCUMENTS

| | | | | |
|---|---|---|---|---|
| 2020/0137511 | A1* | 4/2020 | Kim | H04W 4/02 |
| 2021/0314899 | A1* | 10/2021 | Shan | H04W 60/00 |
| 2022/0150809 | A1* | 5/2022 | Guo | H04W 8/24 |
| 2023/0189199 | A1* | 6/2023 | Hao | H04W 24/10<br>455/456.1 |
| 2023/0362591 | A1* | 11/2023 | Edge | H04W 4/029 |

FOREIGN PATENT DOCUMENTS

| | | | |
|---|---|---|---|
| CN | 112414414 | A | 2/2021 |
| WO | 2021188220 | A1 | 9/2021 |
| WO | 2023065086 | A1 | 4/2023 |

* cited by examiner

POSITIONING METHOD, APPARATUS, DEVICE, AND STORAGE MEDIUM

CROSS-REFERENCE

The present application is a U.S. National Stage of International Application No. PCT/CN2022/075939, filed on Feb. 10, 2022, the contents of which are incorporated herein by reference in their entirety for all purposes.

BACKGROUND OF THE INVENTION

Generally, user equipment (UE) needs to be located in a communication system. In the related art, the UE is generally located through Uu measurement between the UE and a plurality of base stations.

SUMMARY OF THE INVENTION

The disclosure provides a method and apparatus for locating, a device and a storage medium, to solve technical problems of low location efficiency and numerous limits.

An example of one aspect of the disclosure provides a method for locating. The method includes:

- receiving a position request transmitted by a position request device, where the position request includes a list of observer UEs and an allowed delay;
- requesting a ranging service from each observer UE, where the ranging service is configured to enable observer UE to range on target UE;
- obtaining a ranging result transmitted by a current service access and mobility management function (AMF) corresponding to first observer UE, where the ranging result includes relative positions between the first observer UE and the target UE;
- transmitting a first location request to the current service AMF corresponding to the first observer UE; and
- obtaining position information, transmitted by the current service AMF corresponding to the first observer UE, of the target UE.

An example of another aspect of the disclosure provides a method for locating. The method includes:

- conducting a ranging service on target UE based on a request of a core network device corresponding to the target UE, where the ranging service is configured to enable observer UE to range on target UE;
- transmitting a ranging result to the core network device corresponding to the target UE, where the ranging result includes relative positions between the observer UE and the target UE;
- obtaining a first location request transmitted by the core network device corresponding to the target UE;
- triggering a location process for the observer UE to determine position information of the target UE; and
- transmitting the position information of the target UE to the core network device corresponding to the target UE.

An example of yet another aspect of the disclosure provides a communication apparatus. The apparatus includes a processor and a memory. The memory stores a computer program. The processor executes the computer program stored in the memory to make the apparatus executes following steps:

- receiving a position request transmitted by a position request device, where the position request includes a list of observer UEs and an allowed delay;

- requesting a ranging service from each observer UE, where the ranging service is configured to enable observer UE to range on target UE;
- obtaining a ranging result transmitted by a current service access and mobility management function (AMF) corresponding to first observer UE, where the ranging result includes relative positions between the first observer UE and the target UE;
- transmitting a first location request to the current service AMF corresponding to the first observer UE; and
- obtaining position information, transmitted by the current service AMF corresponding to the first observer UE, of the target UE.

An example of yet another aspect of the disclosure provides a communication apparatus. The apparatus includes a processor and a memory. The memory stores a computer program. The processor executes the computer program stored in the memory to make the apparatus executes the method according to the example of the above another aspect.

An example of yet another aspect of the disclosure provides a communication apparatus. The apparatus includes: a processor and an interface circuit.

The interface circuit is configured to receive a code instruction and transmit the code instruction to the processor.

The processor is configured to run the code instruction to execute the method according to the example of the above one aspect.

An example of yet another aspect of the disclosure provides a communication apparatus. The apparatus includes: a processor and an interface circuit.

The interface circuit is configured to receive a code instruction and transmit the code instruction to the processor.

The processor is configured to run the code instruction to execute the method according to the example of the above another aspect.

An example of yet another aspect of the disclosure provides a non-transitory computer-readable storage medium, which is configured to store an instruction. When the instruction is executed, the method according to the example of the above one aspect is implemented.

An example of still another aspect of the disclosure provides a non-transitory computer-readable storage medium, which is configured to store an instruction. When the instruction is executed, the method according to the example of the above another aspect is implemented.

DETAILED DESCRIPTION OF THE INVENTION

Figure 1:
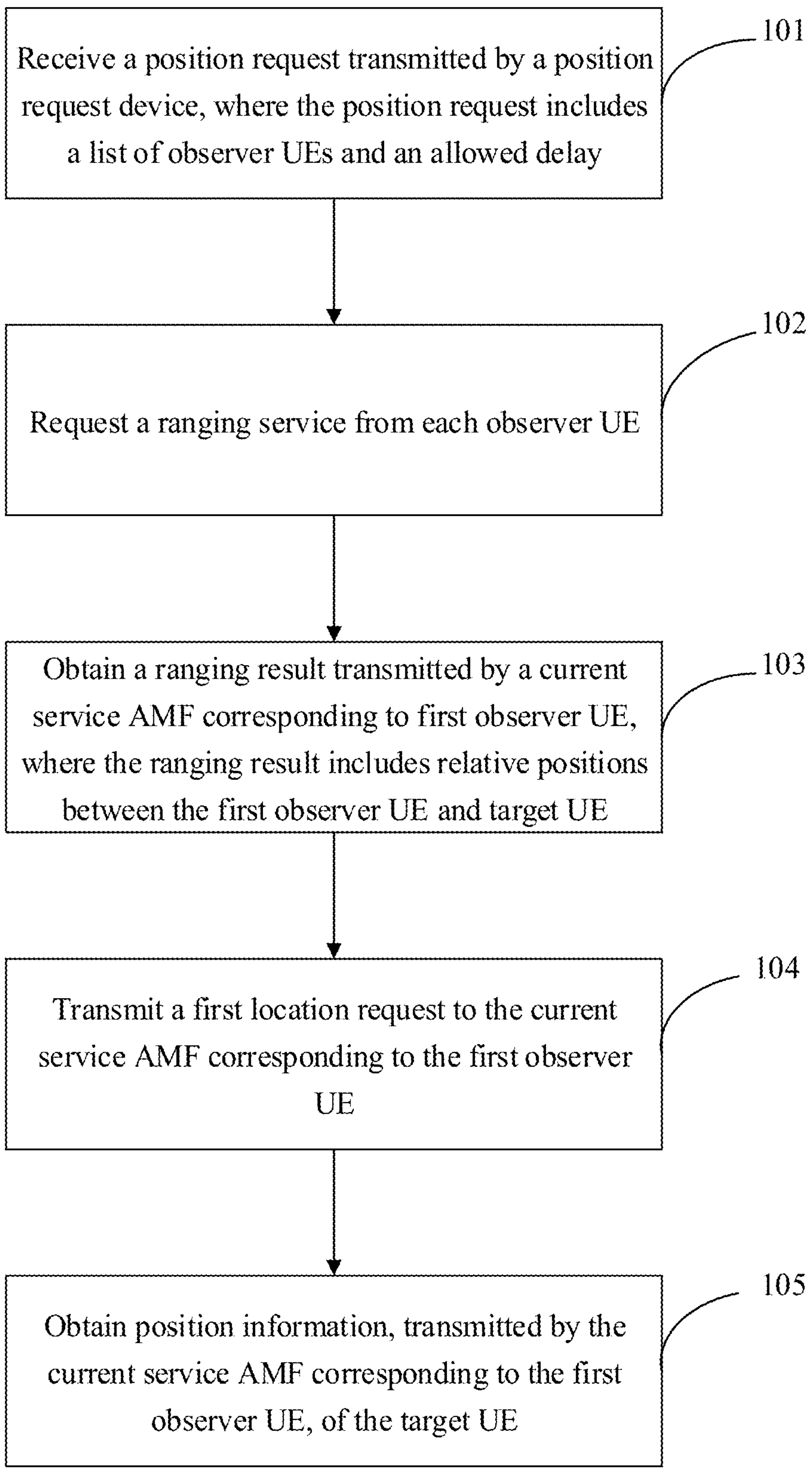
FIG. 1 is a schematic flow diagram of a method for locating according to an example of the disclosure.

Examples will be described in detail here and shown in the accompanying drawings illustratively. When the following descriptions involve the accompanying drawings, unless otherwise specified, the same number in different accompanying drawings denotes the same or similar elements. The embodiments described in the following examples do not denote all embodiments consistent with the examples of the disclosure. On the contrary, the embodiments are merely instances of an apparatus and a method consistent with some aspects of the examples of the disclosure as detailed in the appended claims.

The terms used in the examples of the disclosure are merely to describe the specific examples, instead of limiting the examples of the disclosure. The singular forms such as "a," "an," and "the" used in the examples of the disclosure and the appended claims are also intended to include the plural forms, unless otherwise clearly stated in the context. It is to be further understood that the term "and/or" used here refers to and includes any of one or more of the associated listed items or all possible combinations.

It is to be understood that although the terms such as first, second and third may be used to describe various information in the examples of the disclosure, the information is not intended to be limited to the terms. The terms are merely used to distinguish the same type of information from each other. For instance, without departing from the scope of the examples of the disclosure, first information may also be called second information, and similarly, second information may also be called first information. Depending on the context, the words "if" and "under the condition" as used here can be interpreted as "when," "at the time of" or "in response to determining".

The disclosure relates to the technical field of communication, and particularly relates to a method and apparatus for locating, a device, and a storage medium.

When the UE is located through the Uu measurement in the related art, the following defects will be caused:

(1) The Uu measurement between the UE and the plurality of base stations consume a mass of power. In this case, if the UE used for Uu measurement is UE with power constraint, this UE may be unaffordable the power consumed by the Uu measurement, and thus the Uu measurement may not be successfully performed to implement locating.

(2) The Uu measurement does not support location of the UE out of network coverage of the base station, and is small in application scope.

(3) Accuracy of the Uu measurement depends on a line of sight (LOS) between the UE and the base station. Thus, if the Uu measurement is conducted in a complex environment (for instance, in which the LoS is blocked by a (semi-) static object (for instance, a high shelter in a warehouse) or a moving object (for instance, a running truck)), a location result will be inaccurate.

A method and apparatus for locating, a device, and a storage medium according to the examples of the disclosure will be described in detail below with reference to the accompanying drawings.

FIG. 1 is a schematic flow diagram of a method for locating according to an example of the disclosure. The method is performed by a core network device corresponding to target user equipment (UE). As shown in FIG. 1, the method for locating may include the Step 101-Step 105.

Step 101, a position request transmitted by a position request device is received, where the position request includes a list of observer UEs and an allowed delay.

In an example of the disclosure, the UE may be a device that provides voice and/or data connectivity for a user. A terminal device may be in communication with one or more core networks via a radio access network (RAN). The UE may be an Internet of Things terminal, such as a sensor device, a mobile telephone (also referred to as a cellular telephone) or a computer with Internet of Things terminal, and for instance, may be a fixed, portable, pocket, hand-held, built-in or in-vehicle apparatus. For instance, the UE may be a station (STA), a subscriber unit, a subscriber station, a mobile station, a mobile, a remote station, an access point, a remote terminal, an access terminal, a user terminal, or a user agent. Alternatively, the UE may be a device of an unmanned aerial vehicle. Alternatively, the UE may be an in-vehicle device, for instance, a vehicle computer with a radio communication function, or a radio terminal externally connected to a vehicle computer. Alternatively, the UE may be a roadside device, such as a street lamp with a radio communication function, a signal lamp, or another roadside device.

In an example of the disclosure, the position request device may be a location service client (LCS client) or an application function (AF). The LCS may be any one of an application server, a network function (NF), or the UE. In addition, in an example of the disclosure, the core network device corresponding to the target UE may be a gateway mobile location centre (GMLC) or a network exposure function (NEF).

It is to be noted that in an example of the disclosure, in response to determining that the position request device is the LCS client, the LCS client may directly transmit the position request to the core network device corresponding to the target UE. In another example of the disclosure, in response to determining that the position request device is the AF, the AF may transmit the position request to the core network device corresponding to the target UE through the NEF.

In addition, in an example of the disclosure, the above list of observer UEs may include a unique identifier corresponding to at least one observer UE. For instance, the list of observer UEs may include a subscriber permanent identifier (SUPI) corresponding to the observer UE.

It is to be noted that in an example of the disclosure, the above allowed delay may be an allowed delay of obtaining a ranging result for the target UE later by the core network device corresponding to the target UE. A discovery process and a measurement process of the target UE may consume some time. In this case, after the core network device corresponding to the target UE requests a measurement result for the target UE based on the above position request, the measurement result for the target UE cannot be obtained immediately, and the measurement result for the target UE needs to be obtained after a period of time delay. Thus, a certain allowed delay needs to be set, such that time required for the discovery process and the measurement process of the target UE is reserved.

Step 102, a ranging service is requested from each observer UE.

In an example of the disclosure, the ranging service may be configured to enable the observer UE to range on the target UE.

In addition, in an example of the disclosure, the ranging service is requested from each observer UE may include the following steps:

The GMLC corresponding to the target UE invokes a service operation from unified data management (UDM) through the SUPI of each observer UE, to request the UDM return a network address of a current service access and mobility management function (AMF) corresponding to each observer UE. Then, the GMLC corresponding to the target UE transmits a ranging request to the current service AMF corresponding to each observer UE based on the network address of the current service AMF corresponding to each observer UE, such that the current service AMF corresponding to each observer UE invokes a ranging procedure to trigger each observer UE to conduct the ranging service on the target UE, so that each observer UE is enabled to range on the target UE.

It is to be noted that when the UE accesses a base station, a related service generally needs to be provided by the AMF, and in an example of the disclosure, the "current service AMF corresponding to the observer UE" mentioned above and in the following contents mainly refers to an AMF that provides services for the observer UE at a current moment.

Step 103, a ranging result transmitted by a current service AMF corresponding to first observer UE is obtained.

In the example of the disclosure, the ranging result may include relative positions between the first observer UE and the target UE.

In addition, in an example of the disclosure, the first observer UE may be observer UE corresponding to an AMF, which is the first in AMFs to correspond to all observer UEs to transmit the ranging result to the core network device.

Based on this, in an example of the disclosure, after the core network device corresponding to the target UE receives the ranging result transmitted by the current service AMF corresponding to the first observer UE, the core network device corresponding to the target UE may locate the target UE only by interacting with the first observer UE without interacting with other observer UE. In this way, the core network device corresponding to the target UE may release (that is, stop) the ranging service of remaining observer UE except the first observer UE, such that power consumption is reduced.

Step 104, a first location request is transmitted to the current service AMF corresponding to the first observer UE.

In an example of the disclosure, the first location request may be a network initiated location request (NI-LR), and the first location request may carry the above ranging result "that is, the relative positions between the first observer UE and the target UE". In addition, in an example of the disclosure, the core network device corresponding to the target UE may transmit the first location request to the current service AMF corresponding to the first observer UE based on quality of service (QoS).

Further, in an example of the disclosure, after the current service AMF corresponding to the first observer UE receives the first location request, the current service AMF corresponding to the first observer UE may select a location management function (LMF) as an LMF corresponding to the first observer UE according to available information or local configuration in the AMF. Then, the current service AMF corresponding to the first observer UE may transmit a second location request to the LMF corresponding to the first observer UE. The second location request may include the ranging result. In addition, the second location request may be configured to: enable the LMF corresponding to the first observer UE to locate the first observer UE by executing a location procedure based on the second location request, and determine position information of the target UE based on a location result (that is, a position of the first observer UE) and the ranging result (that is, the relative positions between the first observer UE and the target UE). Then, the current service AMF corresponding to the first observer UE may obtain the position information, transmitted by the LMF corresponding to the first observer UE, of the target UE.

Step 105, the position information, transmitted by the current service AMF corresponding to the first observer UE, of the target UE is obtained.

In many instances, in the method for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Figure 2:
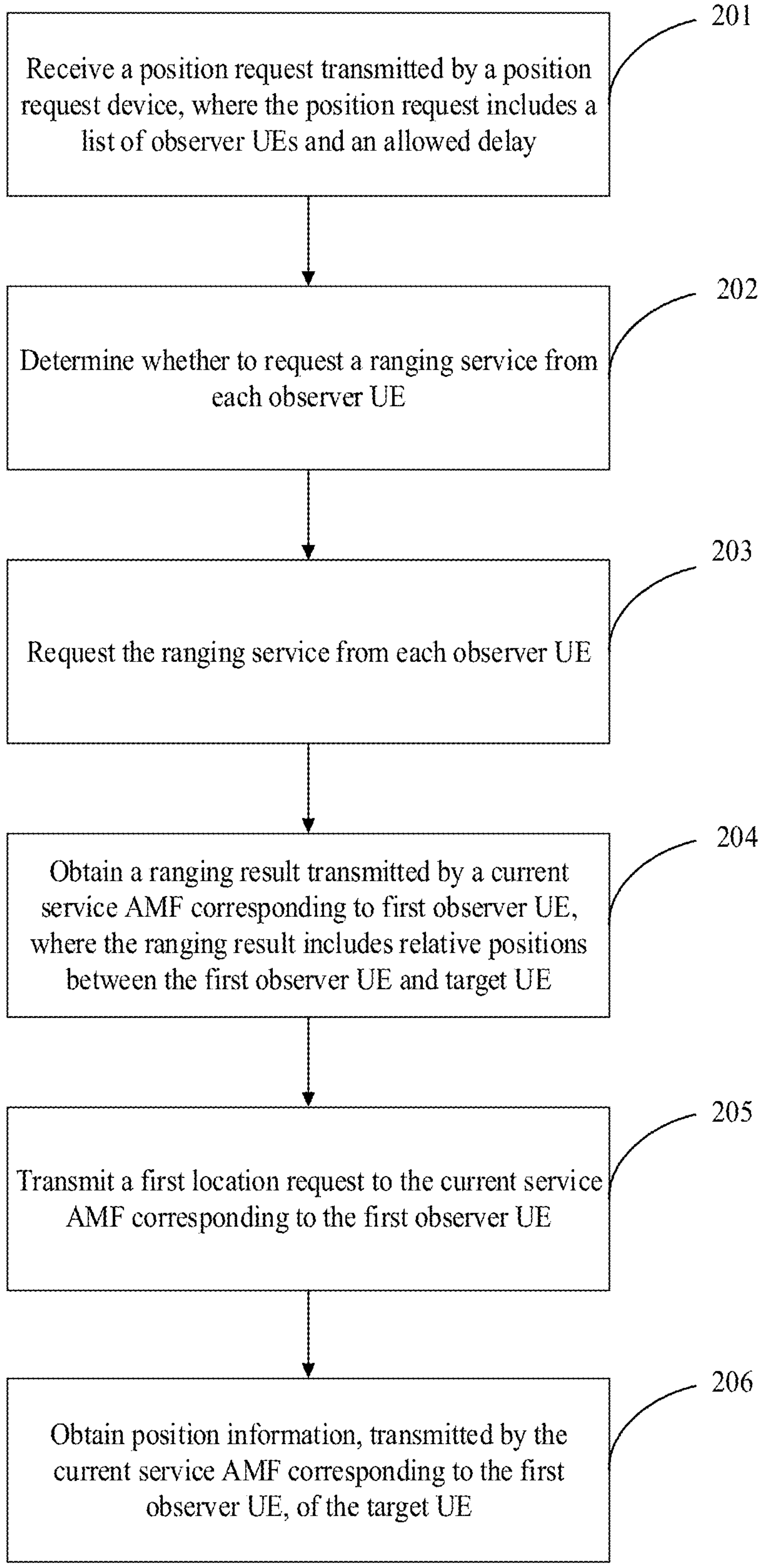
FIG. 2 is a schematic flow diagram of a method for locating according to another example of the disclosure.

FIG. 2 is a schematic flow diagram of a method for locating according to an example of the disclosure. The method is performed by a core network device corresponding to target UE. As shown in FIG. 2, the method for locating may include the Step 201-Step 206.

Step 201, a position request transmitted by a position request device is received, where the position request includes a list of observer UEs and an allowed delay.

Step 202, whether to request a ranging service from each observer UE is determined.

In an example of the disclosure, after the core network device corresponding to the target UE receives the position request transmitted by the position request device, the target UE may be located firstly through Uu measurement. When the core network device corresponding to the target UE locates the target UE through the Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the core network device corresponding to the target UE needs to locate the target UE with the assistance of PC5 measurement (that is, request the ranging service from each observer UE).

Based on this, in an example of the disclosure, after the step 201 is completely executed, the step 202 needs to be executed, that is, whether to request the ranging service from each observer UE is determined.

Further, the method for determining whether to request the ranging service from each observer UE may include at least one of the following steps:

Method 1: a service operation is invoked from UDM to obtain a privacy profile of target UE and a SUPI of the target UE; whether to allow location of the target UE is determined based on the privacy profile of the target UE; in response to allowing location of the target UE, the service operation is invoked from the UDM based on the SUPI of the target UE to request the UDM return a network address of a current service AMF corresponding to the target UE; and in response to determining that the UDM does not return the network address of the current AMF corresponding to the target UE, it is indicated that the target UE is out of network coverage of a base station and Uu measurement cannot be currently executed, such that it is determined to request a ranging service from each observer UE, to locate the target UE through PC5 measurement.

Method 2: whether target UE is power-constrained UE is identified. In response to determining that the target UE is identified to be power-constrained, it is considered that the target UE may be unaffordable the power consumed by Uu measurement, such that it is determined to request a ranging service from each observer UE, to locate the target UE through PC5 measurement.

Method 3: whether an LOS path exists between target UE and a base station is identified. In response to no LOS path between the target UE and the base station, it is indicated that Uu measurement cannot be currently executed, such that it is determined to request a ranging service from each observer UE, to locate the target UE through PC5 measurement.

Method 4: whether an LOS path between target UE and a base station encounters being interfered with is identified. In response to determining that the LOS path between the target UE and the base station encounters being interfered with, it is indicated that a location result may be inaccurate if the target UE is currently located through Uu measurement. In this way, it is determined to request a ranging service from each observer UE, to locate the target UE through PC5 measurement, such that accuracy of the location result is ensured.

In addition, it is to be noted that in an example of the disclosure, if the core network device corresponding to the target UE knows that "the target UE is power-constrained, or the target UE is out of network coverage of a base station, or no LOS path exists between the target UE and a base station, or an LOS path between the target UE and a base station encounters being interfered with" before executing the step 201, step 203 may be directly executed after execution of the step 201 without executing the step 202.

Step 203, the ranging service is requested from each observer UE.

Step 204, a ranging result transmitted by a current service AMF corresponding to first observer UE is obtained, where the ranging result includes relative positions between the first observer UE and target UE.

Step 205, a first location request is transmitted to the current service AMF corresponding to the first observer UE.

Step 206, position information, transmitted by the current service AMF corresponding to the first observer UE, of the target UE is obtained.

In many instances, in the method for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Figure 3:
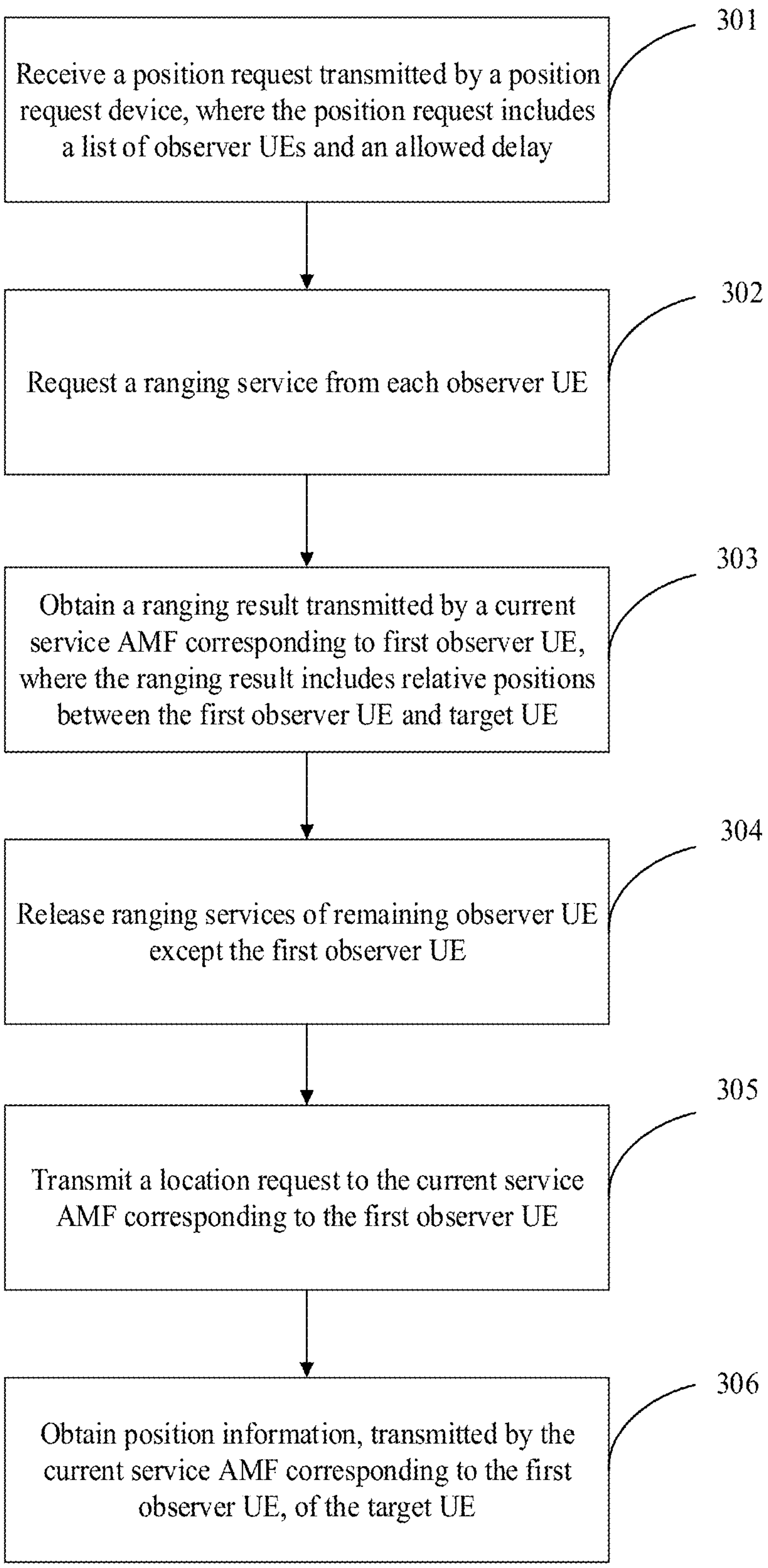
FIG. 3 is a schematic flow diagram of a method for locating according to yet another example of the disclosure.

FIG. 3 is a schematic flow diagram of a method for locating according to an example of the disclosure. The method is executed by a core network device corresponding to target UE. As shown in FIG. 3, the method for locating may include the Step 301-Step 306.

Step 301, a position request transmitted by a position request device is received, where the position request includes a list of observer UEs and an allowed delay.

Step 302, a ranging service is requested from each observer UE.

Step 303, a ranging result transmitted by a current service AMF corresponding to first observer UE is obtained, where the ranging result includes relative positions between the first observer UE and the target UE.

Step 304, ranging services of remaining observer UE except the first observer UE are released.

In an example of the disclosure, after the core network device corresponding to the target UE receives the ranging result transmitted by the current service AMF corresponding to the first observer UE, the core network device corresponding to the target UE may locate the target UE only by interacting with the first observer UE without interacting with other observer UE. In this way, the core network device corresponding to the target UE may release (that is, stop) the ranging service of remaining observer UE except the first observer UE, such that power consumption is reduced.

Step 305, a first location request is transmitted to the current service AMF corresponding to the first observer UE.

Step 306, position information, transmitted by the current service AMF corresponding to the first observer UE, of the target UE is obtained.

In many instances, in the method for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Figure 4:
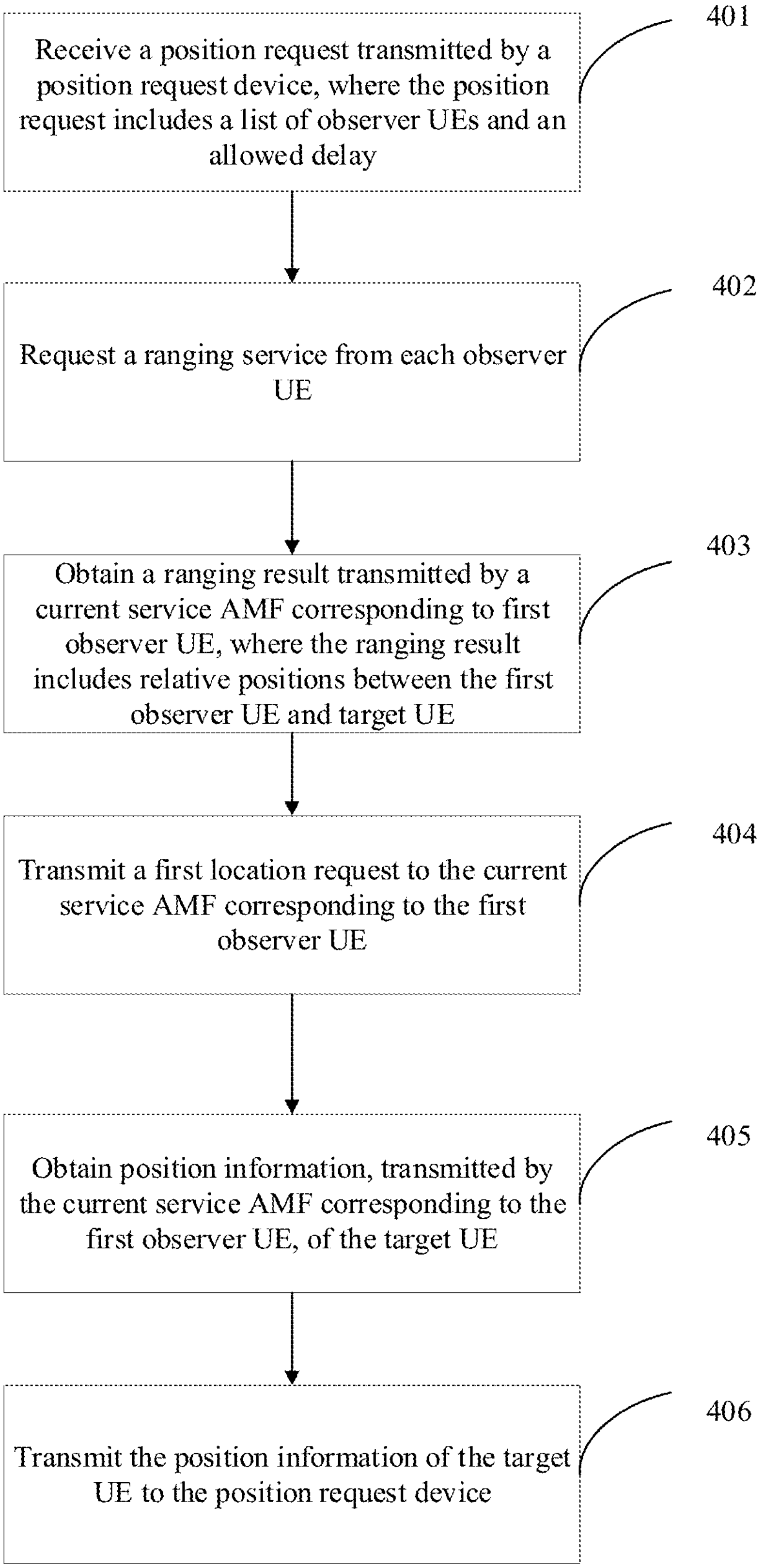
FIG. 4 is a schematic flow diagram of a method for locating according to yet another example of the disclosure.

FIG. 4 is a schematic flow diagram of a method for locating according to an example of the disclosure. The method is executed by a core network device corresponding to target UE. As shown in FIG. 4, the method for locating may include the Step 401-Step 406.

Step 401, a position request transmitted by a position request device is received, where the position request includes a list of observer UEs and an allowed delay.

Step 402, a ranging service is requested from each observer UE.

Step 403, a ranging result transmitted by a current service access and mobility management function (AMF) corresponding to first observer UE is obtained, where the ranging result includes relative positions between the first observer UE and the target UE.

Step 404, a first location request is transmitted to the current service AMF corresponding to the first observer UE.

Step 405, position information, transmitted by the current service AMF corresponding to the first observer UE, of the target UE is obtained.

Step 406, the position information of the target UE is transmitted to the position request device.

In many instances, in the method for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Figure 5A:
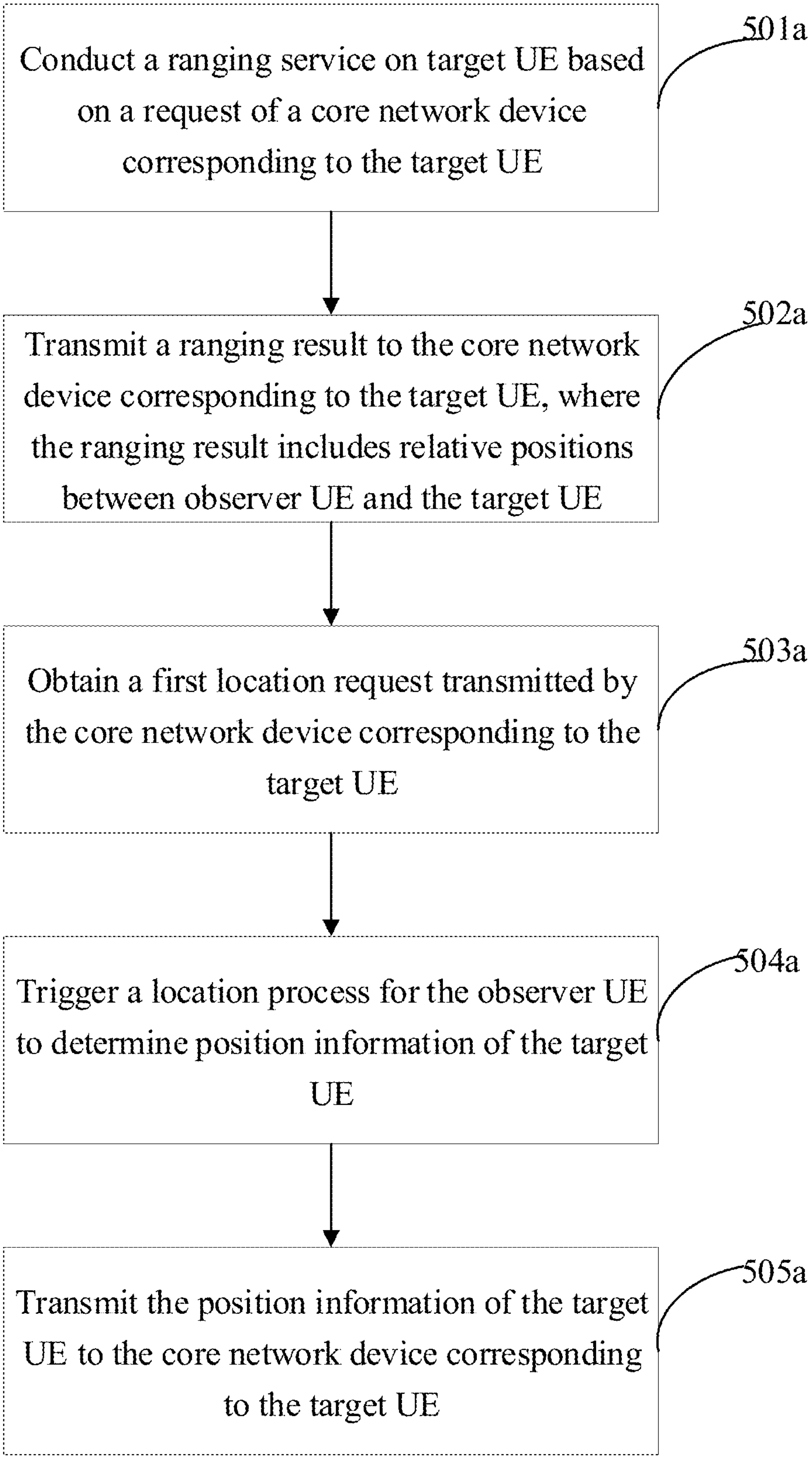
FIG. 5*a* is a schematic flow diagram of a method for locating according to yet another example of the disclosure.

FIG. 5*a* is a schematic flow diagram of a method for locating according to an example of the disclosure. The method is performed by a current service AMF corresponding to observer UE. As shown in FIG. 5*a*, the method for locating may include the Step 501*a*-Step 506*a*.

Step 501*a*, a ranging service is conducted on target UE based on a request of a core network device corresponding to the target UE.

In an example of the disclosure, the step that the ranging service is conducted on the target UE based on the request of the core network device corresponding to the target UE may include the following steps:

a ranging request transmitted by the core network device corresponding to the target UE is obtained;

a ranging procedure is invoked to trigger the observer UE to conduct the ranging service on the target UE; and a ranging result transmitted by the observer UE is obtained.

Step 502*a*, the ranging result is transmitted to the core network device corresponding to the target UE, where the ranging result includes relative positions between the observer UE and the target UE.

Step 503*a*, a first location request transmitted by the core network device corresponding to the target UE is obtained.

Step 504*a*, a location process for the observer UE is triggered, to determine the position information of the target UE.

In an example of the disclosure, the step that the location process for the observer UE is triggered, to determine the position information of the target UE may include the following steps:

A location management function (LMF) is selected as an LMF corresponding to the observer UE based on available information or local configuration of the current service AMF corresponding to the observer UE.

A second location request is transmitted to the LMF corresponding to the observer UE, where the second location request includes the ranging result, such that the LMF corresponding to the observer UE locates the observer UE by executing a location procedure based on the second location request, and determines the position information of the target UE based on a location result and the ranging result.

The position information, transmitted by the LMF corresponding to the observer UE, of the target UE is obtained.

Step 505*a*, the position information of the target UE is transmitted to the core network device corresponding to the target UE.

In many instances, in the method for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Figure 5B:
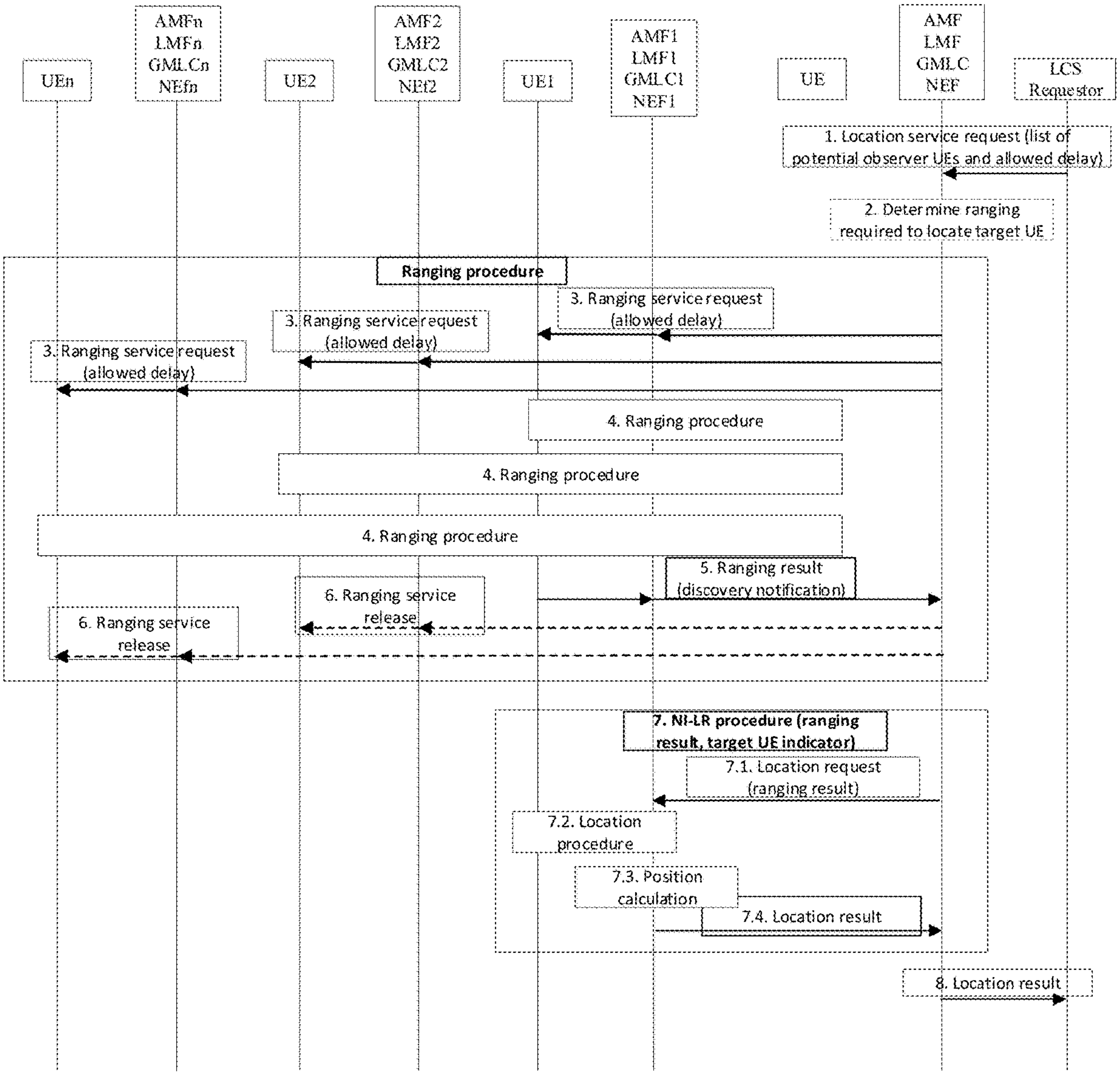
FIG. 5*b* is a schematic flow diagram of a method for locating according to yet another example of the disclosure.

Based on the above description, in order to facilitate understanding of the contents of the disclosure, FIG. 5*b* is a schematic flow diagram of a method for locating according to yet another example of the disclosure. As shown in FIG. 5*b*, the method may include the following steps:

1. An LCS client (such as an application server, an NF or UE) transmits a position request to 5G core network functions (5GC NFs) of target UE, which includes a list of potential observer UEs and an allowed delay. A 5GC NF may be an NEF or GMLC.
2. A 5GC determines ranging required to locate target UE. If the target UE is out of network coverage or a power-constrained or requires high location accuracy and the step occurs before step 1, the step is skipped.
3. A 5GC transmits a ranging service request to UE1, UE2, . . . , and UEn (that is, observer UE). The request includes an allowed delay. The delay is derived based on the allowed delay received in step 1.
4. UE1, UE2, . . . , and UEn may start a ranging procedure for a target.
5. Observer UE that successfully discovers target UE transmits a ranging result having a discovery notification to 5GC NFs.
6. When a ranging result having a discovery notification transmitted by target UE is received from observer UE, a 5GC NF may decide to release a positioning process of remaining observer UE.
7. A 5GC NF starts an NI-LR procedure defined in TS 23.273. The 5GC NF provides a ranging result in an NI-LR request, and an LMF calculates a position of target UE based on position measurement of observer UE and relative positions between the observer UE and the target UE. A location result report of the target UE is transmitted to an LCS client.
8. A location result of target UE is transmitted to an LCS client.

Figure 5C:
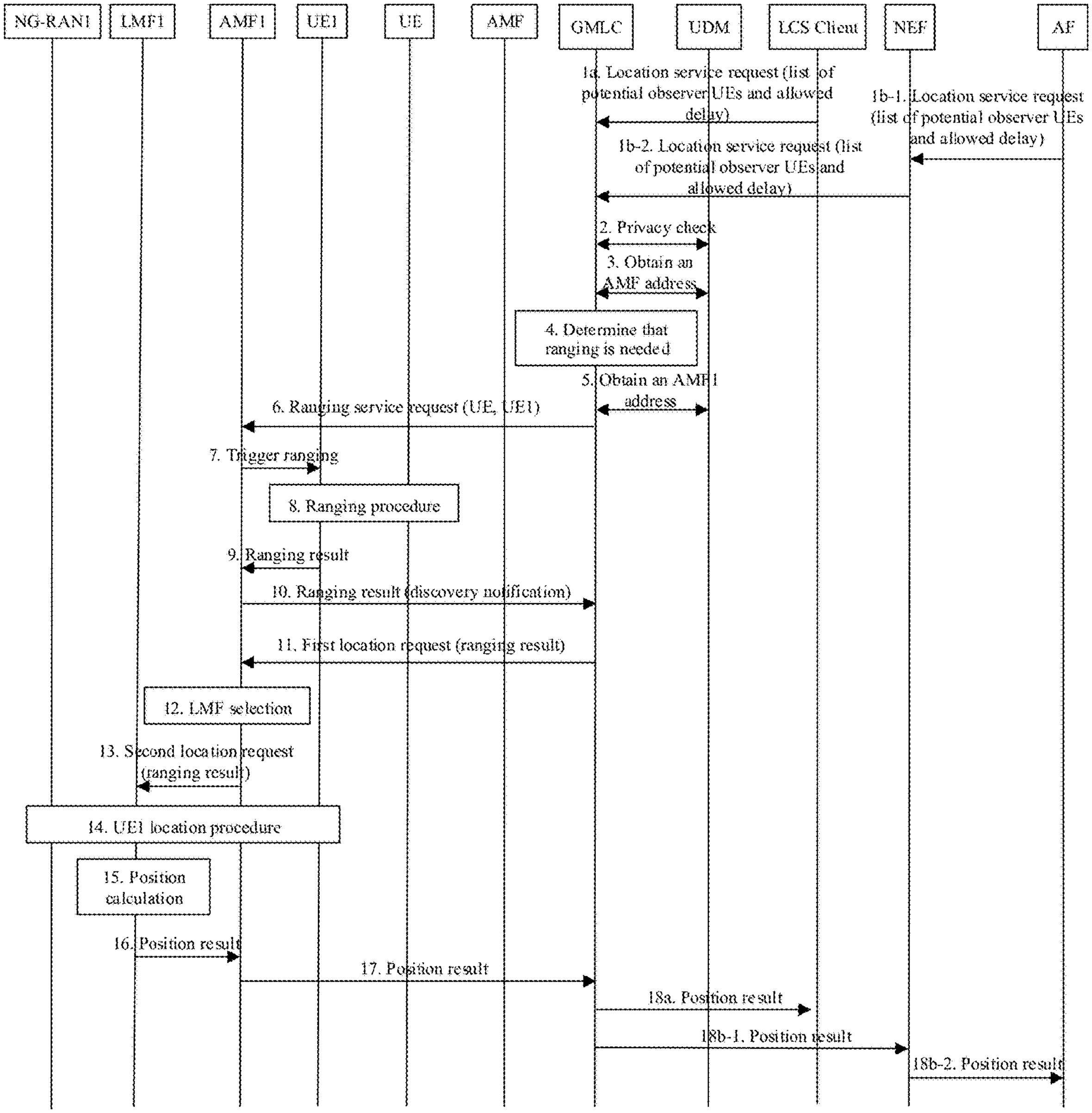
FIG. 5*c* is a schematic flow diagram of a method for locating according to still another example of the disclosure.

In addition, based on the above description, in order to facilitate understanding of the contents of the disclosure, FIG. 5*c* is a schematic flow diagram of a method for locating according to still another example of the disclosure. As shown in FIG. 5*c*, the method may include the following steps:

1. An LCS client or AF (through a NEF) transmits a location service request for target UE to a GMLC. The request may include a list of potential observer UEs and an allowed delay.
2. The GMLC invokes a service operation from UDM of the target UE to obtain privacy settings of UE. The UDM returns the privacy settings of the target UE and an SUPI of the UE. The GMLC checks a privacy profile of the target UE. If the target UE is not allowed to be located, steps 3-15 are skipped.
3. The GMLC invokes the service operation from the UDM of the target UE with the SUPI of the UE. The UDM returns a network address of a current service AMF or without service AMF to the target UE.
4. If the service AMF is not returned in step 3, the GMLC determines that the UE is not registered, which is outside network coverage, and determines that ranging is needed.
5. The GMLC invokes the service operation from the UDM with an SUPI of UE1 (that is, observer UE). The UDM returns the network address of the current service AMF1 to the UE1.
6. The GMLC transmits a ranging request to AMF1, such that ranging between the UE and the UE1 is conducted.
7. The AMF1 invokes a ranging procedure.
8. The UE1 executes a ranging process for the target UE.
9. The UE1 returns a ranging result to the AMF1.

10. The AMF1 transmits the ranging result to the GMLC together with a discovery notification. If the ranging process is successful, the GMLC will execute an NI-LR process according to the following steps defined in TS 22.273. If the ranging process is not successful, steps 11-17 are skipped.
11. The GMLC transmits a first location request including the ranging result to the AMF1 to obtain a position of the UE1.
12. The AMF1 may select an LMF according to available information or local configuration in the AMF.
13. The AMF1 transmits a second location request to LMF1, to locate the UE1. The request includes the ranging result.
14. The LMF1 executes UE1 location procedure.
15. The LMF1 calculates a position of the target UE according to a location result of the observer UE and the ranging result of the target UE.
16. The LMF1 transmits the position of the target UE to the AMF1.
17. The AMF1 forwards the position of the target UE to the GMLC.
18. The position result of the target UE is transmitted to the LCS or AF.

Figure 6:
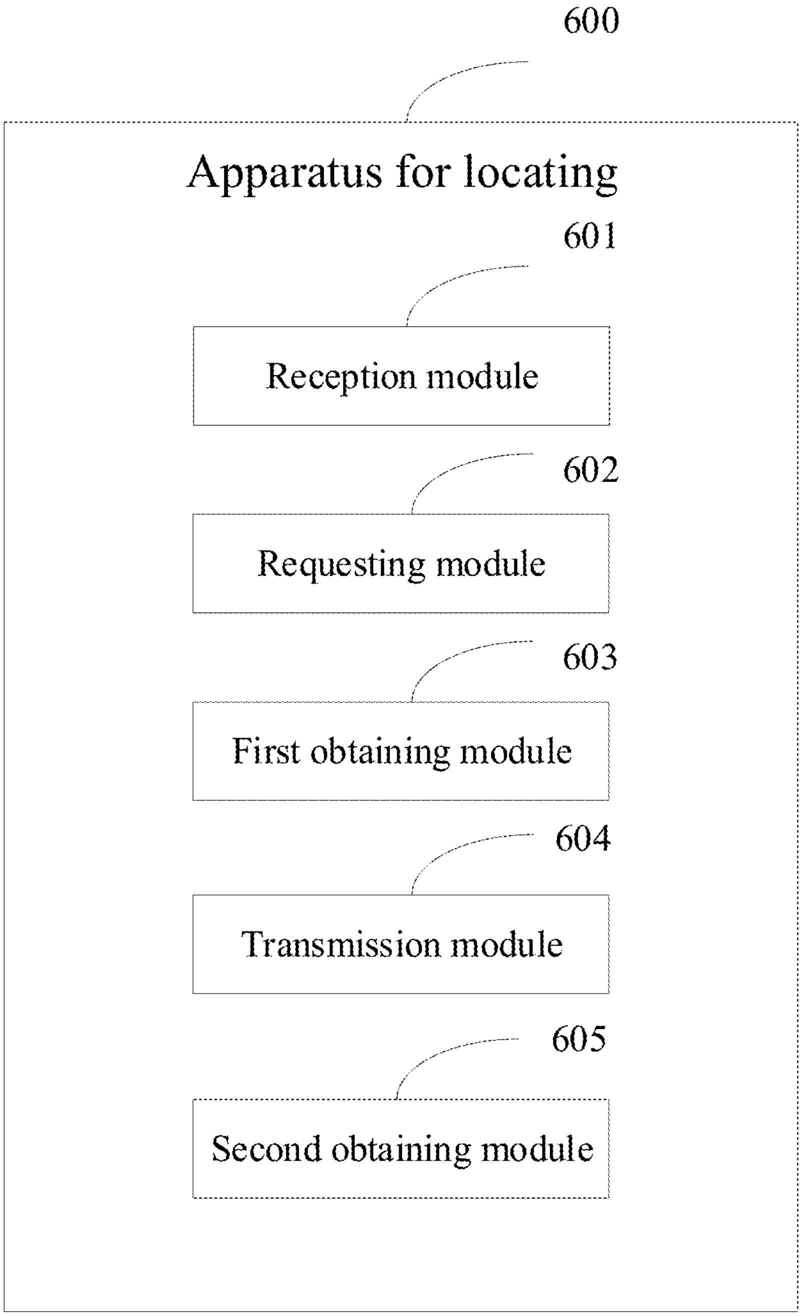
FIG. 6 is a schematic structural diagram of an apparatus for locating according to an example of the disclosure.

FIG. 6 is a schematic structural diagram of an apparatus for locating 600 according to an example of the disclosure. The apparatus is performed by a core network device corresponding to target UE. As shown in FIG. 6, the apparatus for locating 600 may include: a reception module 601, a requesting module 602, a first obtaining module 603, a transmission module 604 and a second obtaining module 605.

- a reception module 601 configured to receive a position request transmitted by a position request device, where the position request includes a list of observer UEs and an allowed delay;
- a requesting module 602 configured to request a ranging service from each observer UE, where the ranging service is configured to enable the observer UE to range on target UE;
- a first obtaining module 603 configured to obtain a ranging result transmitted by a current service access and mobility management function (AMF) corresponding to first observer UE, where the ranging result includes relative positions between the first observer UE and the target UE;
- a transmission module 604 configured to transmit a first location request to the current service AMF corresponding to the first observer UE; and
- a second obtaining module 605 configured to obtain position information, transmitted by the current service AMF corresponding to the first observer UE, of the target UE.

In many instances, in the apparatus for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

In an example of the disclosure, before requesting the ranging service from each observer UE, the apparatus is further configured to:

- determine whether to request the ranging service from each observer UE.

In an example of the disclosure, the apparatus is further configured to:

- invoke a service operation from UDM to obtain a privacy profile of the target UE and a SUPI of the target UE;
- determine whether to allow location of the target UE based on the privacy profile of the target UE;
- invoke, in response to allowing location of the target UE, the service operation from the UDM based on the SUPI of the target UE, to request the UDM to return a network address of the current service AMF corresponding to the target UE; and
- determine, in response to determining that the UDM does not return the network address of the current AMF corresponding to the target UE, to request the ranging service from each observer UE.

In an example of the disclosure, the apparatus is further configured to:

- determine, in response to determining that the target UE is identified to be power-constrained, to request the ranging service from each observer UE.

In an example of the disclosure, the apparatus is further configured to:

- determine, in response to no line of sight (LOS) path between the target UE and a base station, to request the ranging service from each observer UE.

In an example of the disclosure, the apparatus is further configured to:

- determine, in response to LOS path between the target UE and a base station being interfered with, to request the ranging service from each observer UE.

In an example of the disclosure, the core network device corresponding to the target UE is a gateway mobile location centre (GMLC).

Requesting the ranging service from each observer UE includes:

- the service operation is invoked from the UDM through the GMLC, to request the UDM return a network address of the current service AMF corresponding to each observer UE; and a ranging request is transmitted to the current service AMF corresponding to each observer UE through the GMLC based on the network address of the current service AMF corresponding to each observer UE, such that the current service AMF corresponding to each observer UE invokes a ranging procedure to trigger each observer UE to conduct the ranging service on the target UE.

In an example of the disclosure, the first observer UE is observer UE corresponding to an AMF, and the AMF is first in AMFs corresponding to all observer UEs to transmits the ranging result to the core network device.

In an example of the disclosure, after obtaining the ranging result transmitted by the current service AMF corresponding to the first observer UE, the apparatus is further configured to:

release ranging services of remaining observer UE except the first observer UE.

In an example of the disclosure, the apparatus is further configured to:

transmit the position information of the target UE to the position request device.

In an example of the disclosure, the position request device is a location service (LCS) client or an application function (AF).

Figure 7:
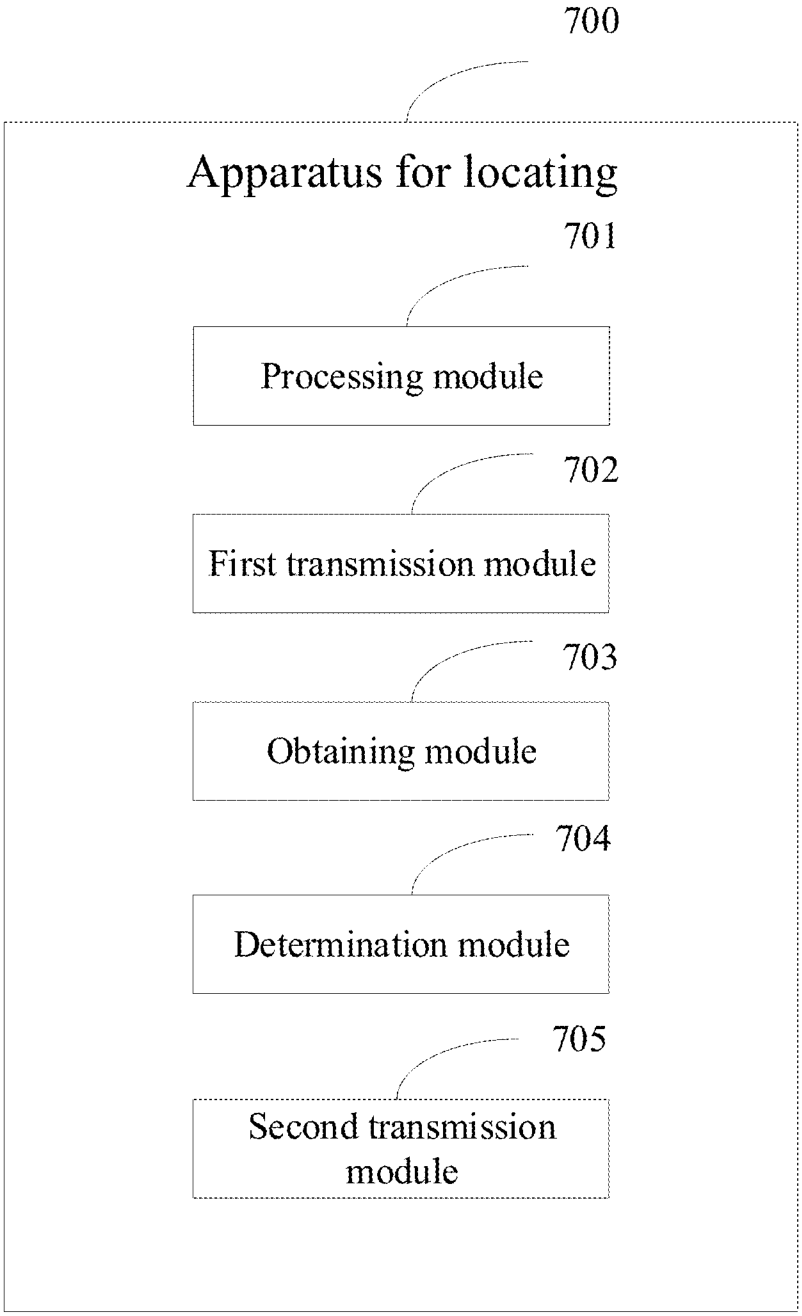
FIG. 7 is a schematic structural diagram of an apparatus for locating according to another example of the disclosure.

FIG. 7 is a schematic structural diagram of an apparatus for locating 700 according to an example of the disclosure. The apparatus is executed by a current service AMF corresponding to observer UE. As shown in FIG. 7, the apparatus for locating 700 may include: a processing module 701, a first transmission module 702, an obtaining module 703, a determination module 704 and a second transmission module 705.

a processing module 701 configured to conduct a ranging service on target UE based on a request of a core network device corresponding to the target UE;

a first transmission module 702 configured to transmit a ranging result to the core network device corresponding to the target UE, where the ranging result includes relative positions between the observer UE and the target UE;

an obtaining module 703 configured to obtain a first location request transmitted by the core network device corresponding to the target UE;

a determination module 704 configured to trigger a location process for the observer UE, and determine position information of the target UE; and a second transmission module 705 configured to transmit the position information of the target UE to the core network device corresponding to the target UE.

In many instances, in the apparatus for locating according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, “the target UE is power-constrained, or the target UE is out of network coverage of a base station, or no line of sight (LOS) path exists between the target UE and a base station, or an LOS path between the target UE and a base station encounters being interfered with,” the locating of the target UE may be realized through the assistance of PC5 measurement. So that successful locating of the target UE is ensured, and the accuracy of the location result is ensured.

In an example of the disclosure, the processing module is further configured to:

obtain a ranging request transmitted by the core network device corresponding to the target UE;

invoke a ranging procedure to trigger the observer UE to conduct the ranging service on the target UE; and obtain the ranging result transmitted by the observer UE.

In an example of the disclosure, the determination module is further configured to:

select an LMF as an LMF corresponding to the observer UE;

transmit a second location request to the LMF corresponding to the observer UE, where the second location request includes the ranging result, such that the LMF corresponding to the observer UE locates the observer UE by executing a location procedure based on the second location request, and determines the position information of the target UE based on a location result and the ranging result; and obtain the position information, transmitted by the LMF corresponding to the observer UE, of the target UE.

Figure 8:
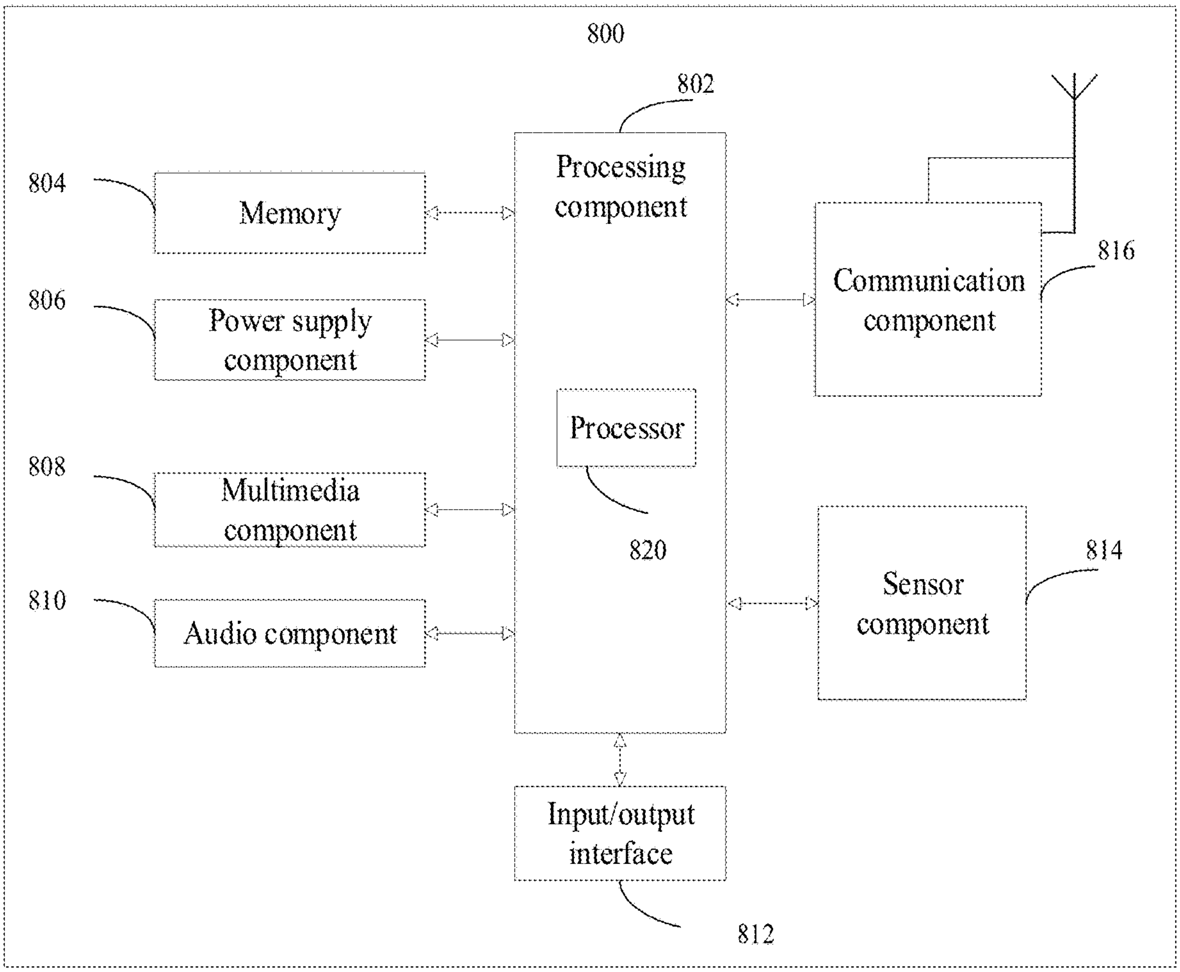
FIG. 8 is a block diagram of user equipment according to an example of the disclosure.

FIG. 8 is a block diagram of user equipment (UE) 800 according to an example of the disclosure. For instance, the UE 800 may be a mobile phone, a computer, a digital broadcast terminal device, a messaging device, a game console, a tablet device, a medical device, a fitness device, a personal digital assistant, etc.

With reference to FIG. 8, the UE 800 may include at least one of the following components: a processing component 802, a memory 804, a power supply component 806, a multimedia component 808, an audio component 810, an input/output (I/O) interface 812, a sensor component 814, and a communication component 816.

The processing component 802 generally controls all operations of the UE 800, such as operations associated with display, telephone call, data communication, camera operation and recording operations. The processing component 802 may include at least one processor 820 for executing an instruction, so as to complete all or some steps of the above method. In addition, the processing component 802 may include at least one module to facilitate interaction between the processing component 802 and other components. For instance, the processing component 802 may include a multimedia module to facilitate interaction between the multimedia component 808 and the processing component 802.

The memory 804 is configured to store various types of data to support operations on the UE 800. Instances of the data include an instruction for any application or method operating on the UE 800, contact data, phone book data, a message, a picture, a video, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk and an optical disk.

The power supply component 806 supplies power to various components of the UE 800. The power supply component 806 may include a power management system, at least one power supply, and other components associated with generating, managing and distributing power for the UE 800.

The multimedia component 808 includes a screen that provides an output interface between the UE 800 and a user. In some examples, the screen may include a liquid crystal display (LCD) and a touch panel (TP). If the screen includes the touch panel, the screen will be implemented as a touch screen to receive an input signal from the user. The touch panel includes at least one touch sensor to sense touch, slide and gestures on the touch panel. The touch sensor may sense a boundary of a touch or slide operation, and detect wake-up time and pressure related to the touch or slide operation. In some examples, the multimedia component 808 includes a front-facing camera and/or a rear-facing camera. When the UE 800 is in an operation mode, such as a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 810 is configured to output and/or input an audio signal. For instance, the audio component 810 includes a microphone (MIC). The microphone is configured to receive an external audio signal when the UE 800 is in operation modes such as a call mode, a recording mode and a voice identification mode. The received audio signal may be further stored in the memory 804 or transmitted via the communication component 816. In some examples, the audio component 810 further includes a speaker configured to output an audio signal.

The I/O interface 812 provides an interface between the processing component 802 and a peripheral interface module. The peripheral interface module may be a keyboard, a click wheel, a button, etc. The buttons may include, but are not limited to, a home button, a volume button, a start button, and a lock button.

The sensor component 814 includes at least one sensor for providing various aspects of state assessment for the UE 800. For instance, the sensor component 814 may detect an on/off state of the UE 800 and relative position of the components, such as a display and a keypad of the UE 800, and the sensor component 814 may further detect location change of the UE 800 or a component of the UE 800, presence or absence of contact between the user and the UE 800, an orientation or acceleration/deceleration of the UE 800, and temperature change of the UE 800. The sensor component 814 may include a proximity sensor configured to detect presence of a nearby object without any physical contact. The sensor component 814 may further include an optical sensor, such as a complementary metal-oxide-semiconductor (CMOS) or charge-coupled device (CCD) image sensor, which is used in imaging application. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, the 2nd generation mobile communication technology (2G) or the 3rd generation mobile communication technology (3G), or their combination. In an example, the communication component 816 receives a broadcast signal or broadcast related information from an external broadcast management system via a broadcast channel. In an example, the communication component 816 further includes a near field communication (NFC) module to facilitate short-range communication. For instance, the NFC module may be implemented based on a radio frequency identification (RFID) technology, an infrared data association (IrDA) technology, an ultra wide band (UWB) technology, a Bluetooth (BT) technology, etc.

In an example, the UE 800 may be implemented by at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, thus executing the method.

Figure 9:
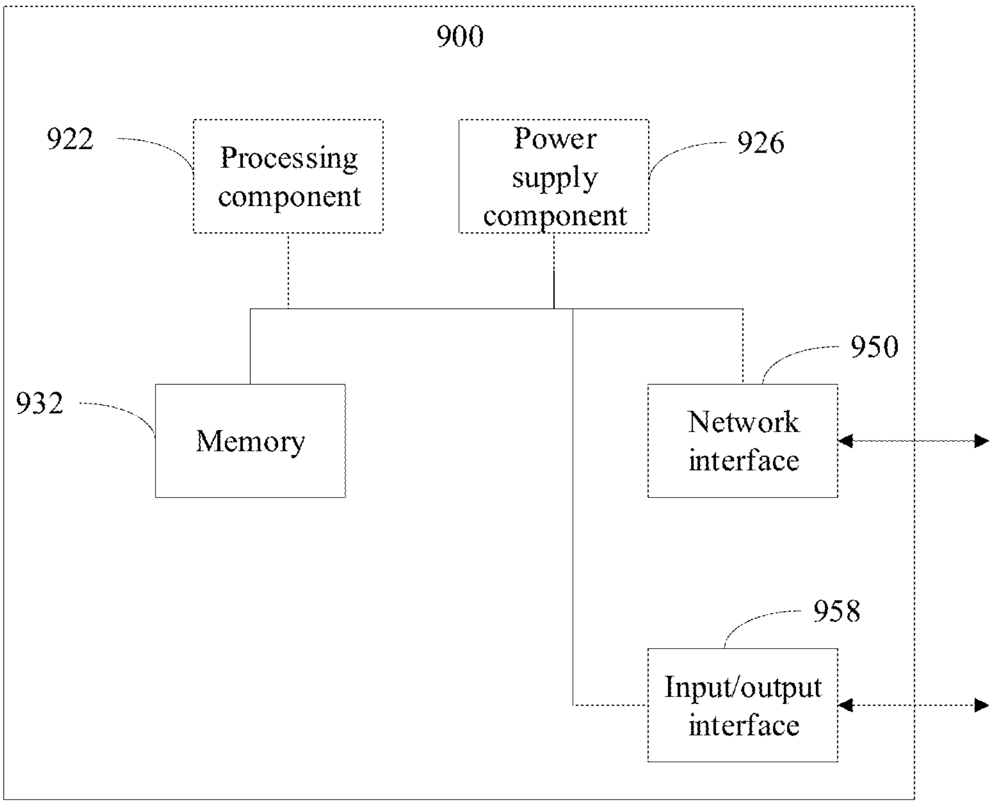
FIG. 9 is a block diagram of a network side device according to an example of the disclosure.

FIG. 9 is a block diagram of a network side device 900 according to an example of the disclosure. For instance, a network side device may be used as the network side device 900. With reference to FIG. 9, the network side device 900 includes a processing component 922, which further includes at least one processor, and a memory resource represented by a memory 932, which is configured to store instructions executable by the processing component 922, such as applications. The application stored in the memory 932 may include one or more modules that each correspond to a group of instructions. In addition, the processing component 922 is configured to execute instructions, so as to execute any one of the methods applied to the network side device, for instance, the method shown in FIG. 1.

The network side device 900 may further include a power supply component 926 configured to conduct power management of the network side device 900, a wired or radio network interface 950 configured to connect the network side device 900 to a network, and an input/output (I/O) interface 958. The network side device 900 may operate based on an operating system stored in the memory 932, such as Windows Server™, Mac OS X™, Unix™, Linux™, Free BSD™, etc.

In the example according to the disclosure, the method according to the example of the disclosure is introduced from aspects of the network side device and the UE separately. In order to achieve functions of the method according to the example of the disclosure, the network side device and the UE may include a hardware structure and a software module. The above functions are achieved in a form of the hardware structure, the software module, or a combination of the hardware structure and the software module. One of the above functions may be executed by a hardware structure, a software module, or a combination of a hardware structure and a software module.

An example of the disclosure provides a communication apparatus. The communication apparatus may include a transceiver module and a processing module. The transceiver module may include a transmission module and/or a reception module. The transmission module is configured to achieve a transmission function. The reception module is configured to achieve a reception function. The transceiver module may achieve the transmission function and/or the reception function.

The communication apparatus may be a terminal device (for instance, the terminal device in the above method example), or an apparatus in a terminal device, or an apparatus used in cooperation with a terminal device. Alternatively, the communication apparatus may be a network device, or an apparatus in a network device, or an apparatus used in cooperation with a network device.

An example of the disclosure provides another communication apparatus. The communication apparatus may be a network device, or a terminal device (for instance, the terminal device in the above method example), or a chip, a chip system or a processor that enables the network device to implement the above method, or a chip, a chip system or a processor that enables the terminal device to implement the above method. The apparatus may be configured to implement the method described in the above method example. Reference may be made to the description in the above method example for details.

The communication apparatus may include one or more processors. The processor may be a general-purpose processor, a special-purpose processor, etc. For instance, the processor may be a baseband processor or a central processing unit. The baseband processor may be configured to process a communication protocol and communication data. The central processing unit may be configured to control the communication apparatus (for instance, a network side device, a baseband chip, a terminal device, a terminal device chip, a distributed unit (DU), or a centralized unit (CU)), execute a computer program, and process data of the computer program.

In some examples, the communication apparatus may further include one or more memories. The memory may store a computer program. The processor executes the computer program in such a way that the communication apparatus executes the method described in the above method example. In some examples, the memory may further store data. The communication apparatus and the memory may be arranged separately or integrated with each other.

In some examples, the communication apparatus may further include a transceiver and an antenna. The transceiver may be referred to as a transmission-reception unit, a transmission-reception machine, a transmission-reception circuit, etc., and is configured to achieve a transceiving function. The transceiver may include a receiver and a transmitter. The receiver may be referred to as a reception machine or a reception circuit, and is configured to achieve a reception function. The transmitter may be referred to as a transmission machine or a transmission circuit, and is configured to achieve a transmission function.

In some examples, the communication apparatus may further include one or more interface circuits. The interface circuit is configured to receive a code instruction and transmit the code instruction to the processor. The processor runs the code instruction, such that the communication apparatus executes the method described in the above method example.

The communication apparatus is a terminal device (for instance, the terminal device in the above method example): the processor is configured to execute the method shown in any one of FIGS. 1-4.

The communication apparatus is a network device: the transceiver is configured to execute the method shown in any one of FIGS. 5-7.

In an embodiment, the processor may include the transceiver configured to achieve reception and transmission functions. For instance, the transceiver may be a transmission-reception circuit, an interface, or an interface circuit. The transmission-reception circuit, interface or interface circuit configured to achieve the reception and transmission functions may be separated or integrated. The transmission-reception circuit, interface or interface circuit may be configured to read and write codes/data. Alternatively, the transmission-reception circuit, interface or interface circuit may be configured to transmit or transfer a signal.

In an embodiment, the processor may store a computer program. The computer program runs on the processor, such that the communication apparatus may execute the method described in the above method example. The computer program may be cured in the processor. In this case, the processor may be implemented by hardware.

In an embodiment, the communication apparatus may include a circuit. The circuit may achieve the transmission or reception or communication function in the above method example. The processor and transceiver described in the disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured by means of various IC process technologies, such as a complementary metal oxide semiconductor (CMOS), an n-metal oxide semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication apparatus according to the above examples may be the network device or the terminal device (for instance, the terminal device in the above method example), which does not limit the scope of the communication apparatus according to the disclosure. A structure of the communication apparatus may not be limited. The communication apparatus may be an independent device or may be part of a large device. For instance, the communication apparatus may be:

(1) an independent integrated circuit (IC), or a chip, or a chip system, or a subsystem;

(2) a set having one or more ICs, where the IC set may also include a storage component configured to store data and a computer program;

(3) an ASIC, for instance, a modem;

(4) a module that may be embedded in other devices;

(5) a receiver, a terminal device, an intelligent terminal device, a cellular phone, a radio device, a handset, a mobile unit, an in-vehicle device, a network device, a cloud device, an artificial intelligence device, etc.; and (6) a different device.

In a case that the communication apparatus may be a chip or a chip system, the chip includes a processor and an interface. A number of processors may be one or more. A number of interfaces may be more than one.

In some examples, the chip further includes a memory. The memory is configured to store a computer program and data that are necessary.

Those skilled in the art may further understand that various illustrative logical blocks and steps listed in the examples of the disclosure may be implemented by electronic hardware, computer software, or a combination of electronic hardware and computer software. Whether the function is achieved by hardware or software depends on specific applications and design requirements of an entire system. Those skilled in the art may achieve the described functions for each particular application through different methods, but such implementation is not considered to be beyond the protection scope of the examples of the disclosure.

The disclosure further provides a non-transitory computer-readable storage medium, which stores an instruction. When the instruction is executed by a computer, functions of any one of the above method examples are achieved.

The disclosure further provides a computer program product. When the computer program product is executed by a computer, functions of any one of the above method examples are achieved.

The above examples may be partially or completely implemented with software, hardware, firmware or any combination of them. When implemented with software, the examples may be partially or completely implemented in the form of a computer program product. The computer program product includes one or more computer programs. When the computer program is loaded and executed on the computer, flows or functions according to the examples of the disclosure are partially or completely generated. The computer may be a general-purpose computer, a special-purpose computer, a computer network, or other programmable apparatuses. The computer program may be stored in a computer-readable storage medium or transmitted from a computer-readable storage medium to another computer-readable storage medium. For instance, the computer program may be transmitted from a website, a computer, a server or a data center to another website, another computer, another server or another data center in a wired way (for instance, a coaxial cable, an optical fiber, or a digital subscriber line (DSL)) or a wireless way (for instance, infrared waves, radio, or microwaves). The computer-readable storage medium may be any available medium that may be accessed by the computer or a data storage device such as an integration server and data center that includes one or more available media. The available medium may be a magnetic medium (for instance, a floppy disk, a hard disk, or a magnetic tape), an optical medium (for instance, a high-density digital video disc (DVD)), a semiconductor medium (for instance, a solid state disk (SSD)), etc.

In many instances, in a method and apparatus for locating, a device and a storage medium according to the examples of the disclosure, the core network device corresponding to the target UE may receive the position request transmitted by the position request device, where the position request includes the list of observer UEs and the allowed delay. Then, the core network device corresponding to the target UE may request the ranging service from each observer UE, where the ranging service is configured to enable the observer UE to range on the target UE. In addition, the core network device corresponding to the target UE may further obtain the ranging result transmitted by the current service AMF corresponding to the first observer UE, where the ranging result includes the relative positions between the first observer UE and the target UE. Finally, the core network device corresponding to the target UE may transmit the first location request to the current service AMF corresponding to the first observer UE, and obtain the position information, transmitted by the current service AMF corresponding to the first observer UE, of the target UE. Thus, in the example of the disclosure, the core network device corresponding to the target UE may obtain the position information, measured by the first observer UE, of the target UE by requesting the ranging service from the observer UE and transmitting the first location request to the current service AMF corresponding to the first observer UE. That is, in the example of the disclosure, when the target UE is located through Uu measurement, if the target UE cannot be accurately located through the Uu measurement, for instance, "the target UE is power-constrained, or the target UE is out of network coverage of a base station, or no line of sight (LOS) path exists between the target UE and a base station, or an LOS path between the target UE and a base station encounters being interfered with," the locating of the target UE may be realized through the assistance of PC5 measurement. So that successful locating of the target UE is ensured, and the accuracy of the location result is ensured.

Those of ordinary skill in the art may understand that numerical symbols such as "first" and "second" involved in the disclosure are only for convenience of description, instead of limiting the scope of the examples of the disclosure, and further indicate a sequence.

"At least one" in the disclosure may also be described as "one or more," and "a plurality of" may indicate two, three, four, or more, which are not limited by the disclosure. In the example of the disclosure, for a technical feature, technical features in the technical feature are distinguished by "first," "second," "third," "A," "B," "C," "D," etc. The technical features described by the "first," "second," "third," "A," "B," "C" and "D" are not in order of succession or order of size.

Those skilled in the art could easily conceive of other implementation solutions of the disclosure upon consideration of the description and practice of the invention disclosed here. The disclosure is intended to cover any variations, uses or adaptive changes of the disclosure, and these variations, uses or adaptive changes follow the general principles of the disclosure and include common general knowledge or conventional technical means that is not disclosed in the art. The description and the examples are regarded as merely illustrative, and the true scope and spirit of the disclosure are indicated by the following claims.

It is to be understood that the disclosure is not limited to a precise structure described above and illustrated in the accompanying drawings, and can have various modifications and changes without departing from the scope. The scope of the disclosure is limited merely by the appended claims.

The invention claimed is:

1. A method for locating a target User Equipment (UE), the method comprising:

receiving a position request transmitted by a position request device, wherein the position request comprises a list of observer UEs and an allowed delay;

requesting a ranging service from observer UE, wherein the ranging service is configured to enable observer UE to range on target UE;

obtaining a ranging result transmitted by a current service access and mobility management function (AMF) corresponding to first observer UE, wherein the ranging result comprises relative positions between the first observer UE and the target UE;

transmitting a first location request to the current service AMF corresponding to the first observer UE; and obtaining position information, transmitted by the current service AMF corresponding to the first observer UE, of the target UE.

2. The method according to claim 1, wherein before requesting the ranging service from observer UE, the method further comprises:

determining whether to request the ranging service from observer UE.

3. The method according to claim 2, wherein determining whether to request the ranging service from observer UE comprises:

invoking a service operation from unified data management (UDM) to obtain a privacy profile of the target UE;

determining whether to allow location of the target UE based on the privacy profile of the target UE;

invoking, in response to allowing location of the target UE, a service operation from the UDM to request the UDM return a network address of the current service AMF corresponding to the target UE; and determining, in response to determining that the UDM does not return the network address of the current service AMF corresponding to the target UE, to request the ranging service from observer UE.

4. The method according to claim 2, wherein determining whether to request the ranging service from observer UE comprises:

determining, in response to determining that the target UE is identified to be power-constrained, to request the ranging service from observer UE.

5. The method according to claim 2, wherein determining whether to request the ranging service from observer UE comprises:

determining, in response to no line of sight (LOS) path between the target UE and a base station, to request the ranging service from observer UE.

6. The method according to claim 2, wherein determining whether to request the ranging service from observer UE comprises:

determining, in response to LOS path between the target UE and a base station being interfered with, to request the ranging service from observer UE.

7. The method according to claim 1, wherein a core network device corresponding to the target UE is a gateway mobile location centre (GMLC); and requesting the ranging service from observer UE comprises:

invoking a service operation from a unified data management (UDM) through the GMLC to request the UDM to return a network address of the current service AMF corresponding to observer UE; and transmitting a ranging request to the current service AMF corresponding to observer UE through the GMLC based on the network address of the current service AMF corresponding to observer UE, thereby enabling the current service AMF corresponding to observer UE invokes a ranging procedure to trigger observer UE to conduct the ranging service on the target UE.

8. The method according to claim 1, wherein the first observer UE is observer UE corresponding to an AMF, and the AMF is first in AMFs corresponding to all observer UEs to transmit the ranging result to a core network device.

9. The method according to claim 8, wherein after obtaining the ranging result transmitted by the current service AMF corresponding to the first observer UE, the method further comprises:

releasing ranging services of remaining observer UE except the first observer UE.

10. The method according to claim 1, the method further comprising:

transmitting the position information of the target UE to the position request device.

11. The method according to claim 1, wherein the position request device is a location service (LCS) client or an application function (AF).

12. A communication apparatus, comprising:

one or more processor; and an interface circuit, wherein the interface circuit is configured to receive a code instruction and transmit the code instruction to the processor; and the one or more processors are collectively configured to perform the method according claim 1.

13. A non-transitory computer-readable storage medium storing instructions, the instruction when executed by one or more processors cause the one or more processors to collectively perform the method according to claim 1.

14. A method for locating, comprising:

conducting a ranging service on target UE based on a request of a core network device corresponding to the target UE, wherein the ranging service is configured to enable observer UE to range on target UE;

transmitting a ranging result to the core network device corresponding to the target UE, wherein the ranging result comprises relative positions between the observer UE and the target UE;

obtaining a first location request transmitted by the core network device corresponding to the target UE;

triggering a location process for the observer UE to determine position information of the target UE; and transmitting the position information of the target UE to the core network device corresponding to the target UE.

15. The method according to claim 14, wherein conducting the ranging service on the target UE based on the request of the core network device corresponding to the target UE comprises:

obtaining a ranging request transmitted by the core network device corresponding to the target UE;

invoking a ranging procedure to trigger the observer UE to conduct the ranging service on the target UE; and obtaining the ranging result transmitted by the observer UE.

16. The method according to claim 14, wherein triggering the location process for the observer UE to determine the position information of the target UE comprise:

selecting a location management function (LMF) as an LMF corresponding to the observer UE;

transmitting a second location request to the LMF corresponding to the observer UE, wherein the second location request comprises the ranging result, thereby enabling the LMF corresponding to the observer UE locates the observer UE by executing a location procedure based on the second location request, and determines the position information of the target UE based on a location result and the ranging result; and obtaining the position information, transmitted by the LMF corresponding to the observer UE, of the target UE.

17. A communication apparatus, comprising:

one or more processors; and a memory that stores a computer program, and wherein the computer program stored in the memory when executed by the one or more processors cause the communication apparatus to perform the method according to claim 14.

18. A communication apparatus, comprising:

one or more processors; and an interface circuit, wherein the interface circuit is configured to receive a code instruction and transmit the code instruction to the processor; and the one or more processors are collectively configured to perform the method according to claim 14.

19. A non-transitory computer-readable storage medium storing instructions, the instructions when executed by one or more processors cause the one or more processors to collectively perform the method according to claim 14.

20. A communication apparatus, comprising:

one or more processors; and a memory that stores a computer program, and wherein the computer program when executed by the one or more processors causes the one or more processors to collectively:

receive a position request transmitted by a position request device, wherein the position request comprises a list of observer UEs and an allowed delay;

request a ranging service from observer UE, wherein the ranging service is configured to enable observer UE to range on target UE;

obtain a ranging result transmitted by a current service access and mobility management function (AMF) corresponding to first observer UE, wherein the ranging result comprises relative positions between the first observer UE and the target UE;

transmit a first location request to the current service AMF corresponding to the first observer UE; and obtain position information, transmitted by the current service AMF corresponding to the first observer UE, of the target UE.

* * * * *